(12) United States Patent
Lai et al.

(10) Patent No.: US 8,016,012 B2
(45) Date of Patent: Sep. 13, 2011

(54) FLATTENING MECHANISM FOR DRY FILM LAMINATOR

(76) Inventors: Chin-Sen Lai, Taichung (TW);
Ming-Tsung Chen, Taichung (TW)

( * ) Notice: Subject to any disclaimer, the term of this patent is extended or adjusted under 35 U.S.C. 154(b) by 82 days.

(21) Appl. No.: 12/699,070

(22) Filed: Feb. 3, 2010

(65) Prior Publication Data
US 2011/0186239 A1    Aug. 4, 2011

(51) Int. Cl.
*B32B 37/00* (2006.01)
(52) U.S. Cl. .................. 156/583.1; 156/537; 156/581
(58) Field of Classification Search .......... 156/381, 156/382, 537, 580, 581, 583.1
See application file for complete search history.

(56) References Cited

U.S. PATENT DOCUMENTS

| | | | | |
|---|---|---|---|---|
| 6,367,530 B1 * | 4/2002 | Shimotomai | ............... | 156/382 |
| 6,451,670 B1 * | 9/2002 | Takisawa et al. | ............ | 438/457 |
| 6,481,482 B1 * | 11/2002 | Shimotomai | ................ | 156/366 |
| 7,537,670 B2 * | 5/2009 | Takeyama | .................... | 156/285 |
| 7,819,165 B2 * | 10/2010 | Hashizume et al. | ....... | 156/583.1 |

\* cited by examiner

*Primary Examiner* — James Sells

(57) ABSTRACT

A flattening mechanism for dry film laminator includes a lower member connected to a dry film laminator. The lower member has a base portion formed thereon. The base portion has a plurality of air holes defined therein. The lower member has a lifting holder movably disposed thereon for holding a wafer. The wafer has a dry film disposed thereon. An upper member is movably disposed above the lower member. The upper member has a pressing portion disposed on a bottom thereof. The pressing portion has a steel plate disposed thereon and a first electric heating layer mounted on a top of the steel. A release film is movably guided between the upper member and the lower member, such that the wafer is lifted to press against the steel plate via the release film for enhancing a lamination of the dry film to the wafer and flattening the dry film.

3 Claims, 5 Drawing Sheets

FLATTENING MECHANISM FOR DRY FILM LAMINATOR

BACKGROUND OF THE INVENTION

1. Field of the Invention

The present invention relates to a flattening mechanism for dry film laminator, and more particularly to a flattening mechanism for flattening a dry film which is pre-laminated on a wafer or a dry film without pre-lamination.

2. Description of Related Art

A conventional laminating and trimming mechanism for semiconductor wafer in accordance with the prior art comprises a housing, a base received in the housing and horizontally disposed on an inner bottom of the housing, and an upper trimming device received in the housing. The upper trimming device is movably suspended from an inner top of the housing via multiple shafts and is able to move upwardly/downwardly relative to the housing. The upper trimming device includes an annular outer member, an annular inner member, and an annular blade mounted on a bottom thereof. A lower device is received in the housing. The lower device is disposed on a top of the base and corresponds to the upper trimming device for holding a wafer. A supply device is disposed beside the lower device for supplying a dry film. A take-up device is disposed beside the lower device opposite the supply device for collecting the used dry film.

As shown in FIG. 1, the wafer 11 has a plurality of dies 13 spacedly formed on a top thereof and the dry film 12 is guided on the dies of the wafer. When the upper trimming device is operated to move downwardly, the dry film is pressed on the wafer. The annular blade trims the dry film around the wafer. However, in the conventional laminating and trimming mechanism, a soft member which is disposed on the upper trimming device is used for pressing the dry film on the wafer. As shown in FIG. 2, after lamination, the dry film 12 covers the dies 13 on the wafer 11 but a top surface of the dry film 12 is not flattened and protrusions are formed thereon due to the dies 13.

The present invention has arisen to mitigate and/or obviate the disadvantages of the conventional trimming mechanism for semiconductor wafer.

SUMMARY OF THE INVENTION

The main objective of the present invention is to provide an improved flattening mechanism for dry film laminator.

To achieve the objective, the flattening mechanism for dry film laminator in accordance with the present invention includes a lower member adapting to be connected to a dry film laminator. The lower member has a base portion formed thereon. The base portion has a plurality of air holes defined therein for extracting air. The lower member has a lifting holder movably disposed thereon and being able to move upwardly/downwardly relative to the base portion. The lifting holder provided for holding a wafer on a top thereof. The wafer adapts to have a dry film which is pre-laminated thereon. The lifting holder has a second electric heating layer mounted therein for heating the wafer placed on the top of the lifting holder.

An upper member is disposed above the lower member and able to move upwardly/downwardly relative to the lower member. The upper member has a pressing portion disposed on a bottom thereof and corresponds to a location of the lifting holder of the lower member. The pressing portion includes a steel plate disposed on a bottom thereof and a first electric heating layer mounted on a top of the steel plate for producing heat, such that heat is able to be transmitted from the first electric heating layer to the steel plate. The pressing portion has a heat insulating layer formed on a top of the first electric heat layer for preventing heat from transmitting to the upper member.

A release film is movably guided and positioned between the upper member and the lower member.

When the upper member moves downwardly against a top of the base portion of the lower member via the release film, a space is defined between the upper member and the lower member. The space communicates with the air holes on the base portion. Air in the space is extracted out through the air holes for making the space to a vacuum state. The lifting holder moves upwardly and the wafer is lifted to press against the steel plate via the release film for adapting to enhance a lamination of the dry film to the wafer. Heat produced by the first electric heating layer is transmitted from the steel plate to the dry film for adapting to flatten the dry film.

In accordance with a second aspect of the present invention, the wafer which is placed on the top of the lifting holder has a dry film disposed on the dies without lamination.

Further benefits and advantages of the present invention will become apparent after a careful reading of the detailed description with appropriate reference to the accompanying drawings.

DETAILED DESCRIPTION OF THE INVENTION

Figure 1:
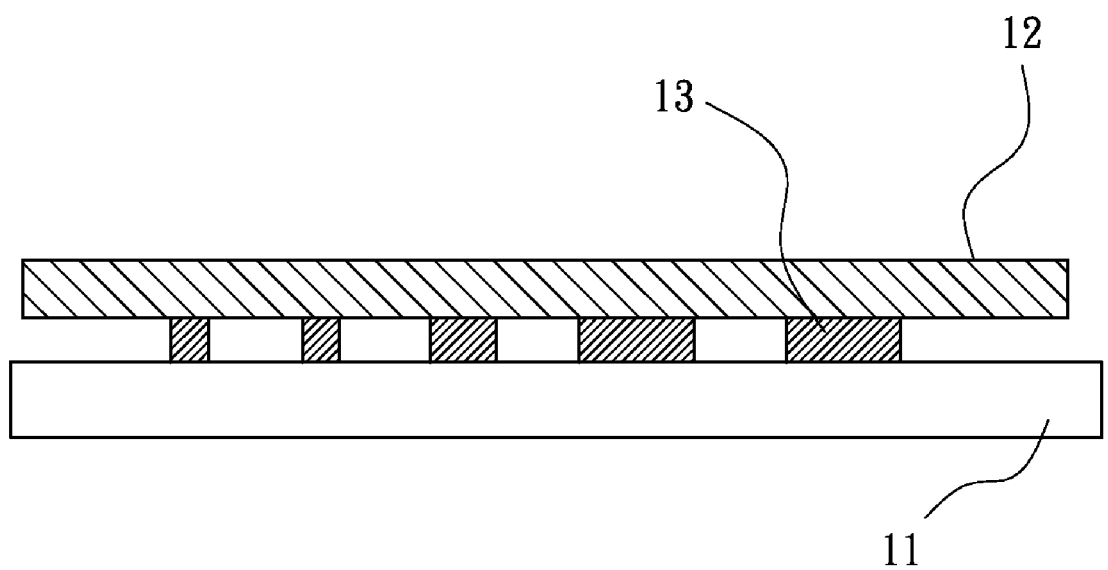
FIGS. 1-2 are plane views which respectively show a wafer having a dry film disposed thereon before and after lamination of the conventional laminating and trimming mechanism for semiconductor wafer.
Figure 2:
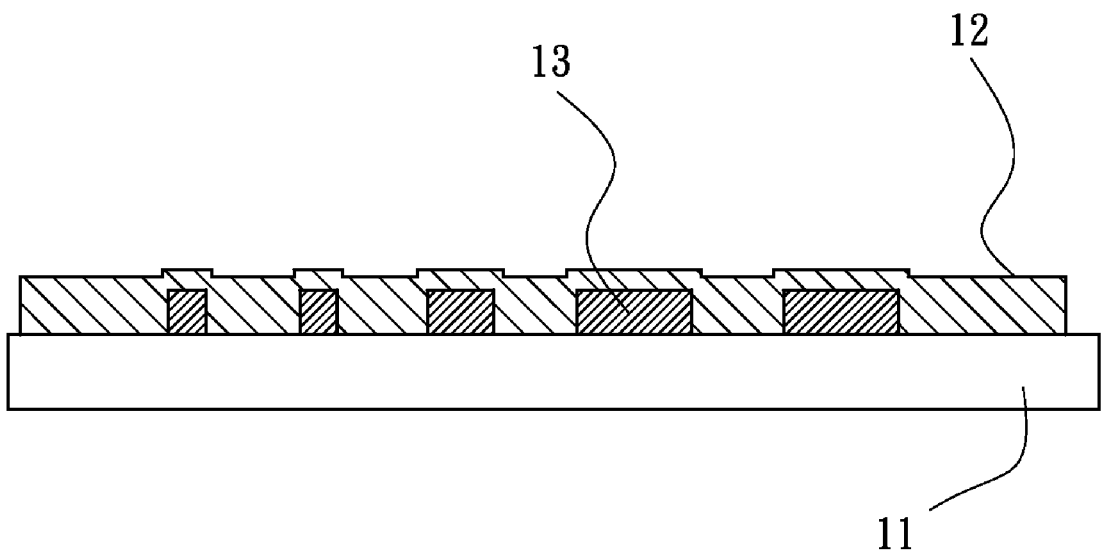
Figure 3:
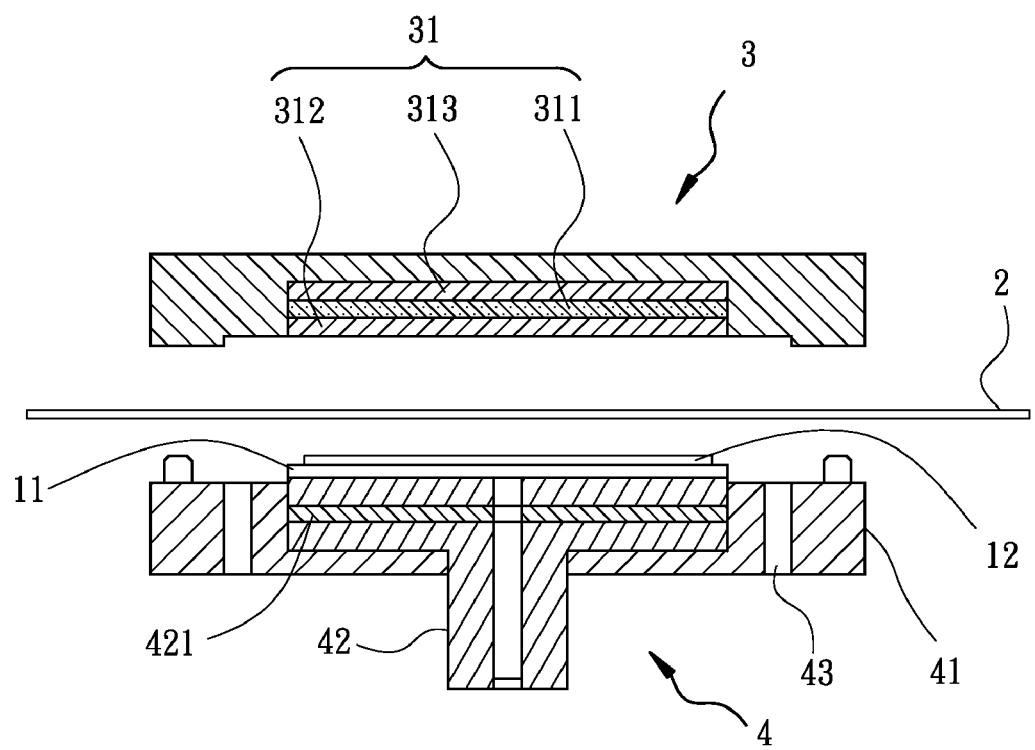
FIGS. 3-6 are operational cross-sectional views of a flattening mechanism for dry film laminator in accordance with the present invention.
Figure 4:
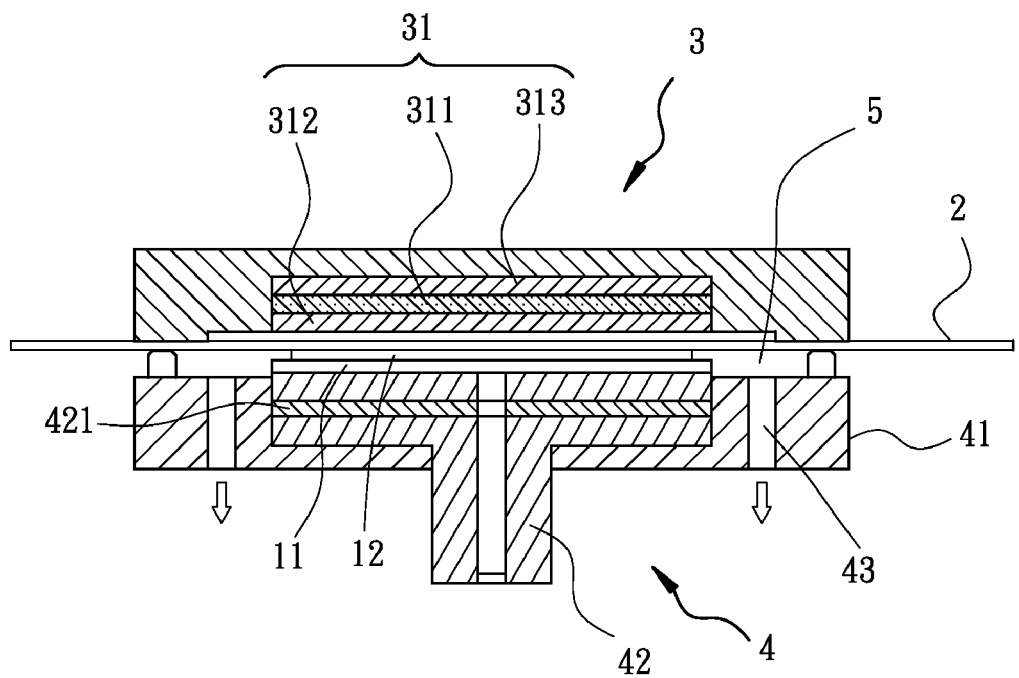
Figure 5:
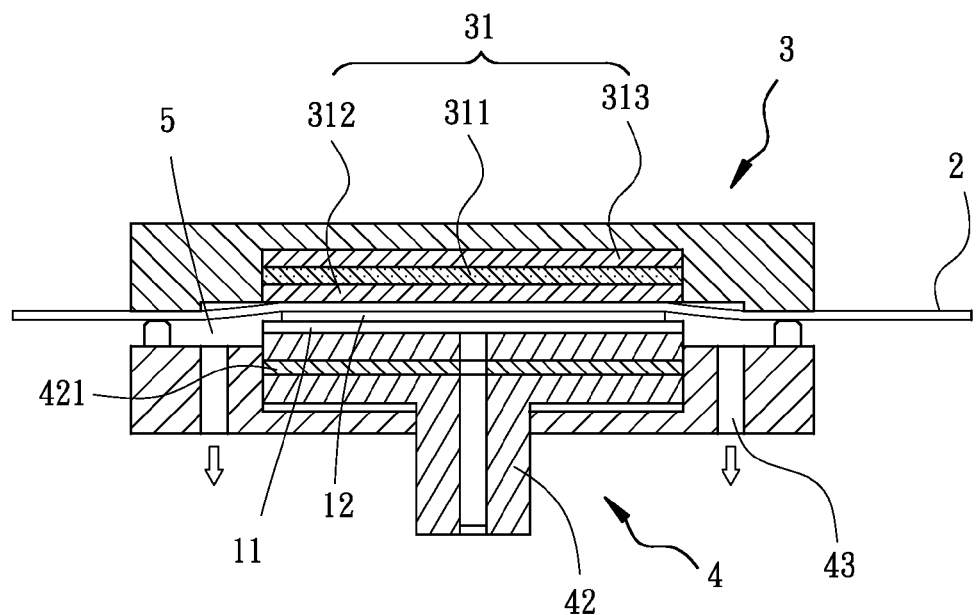
Figure 6:
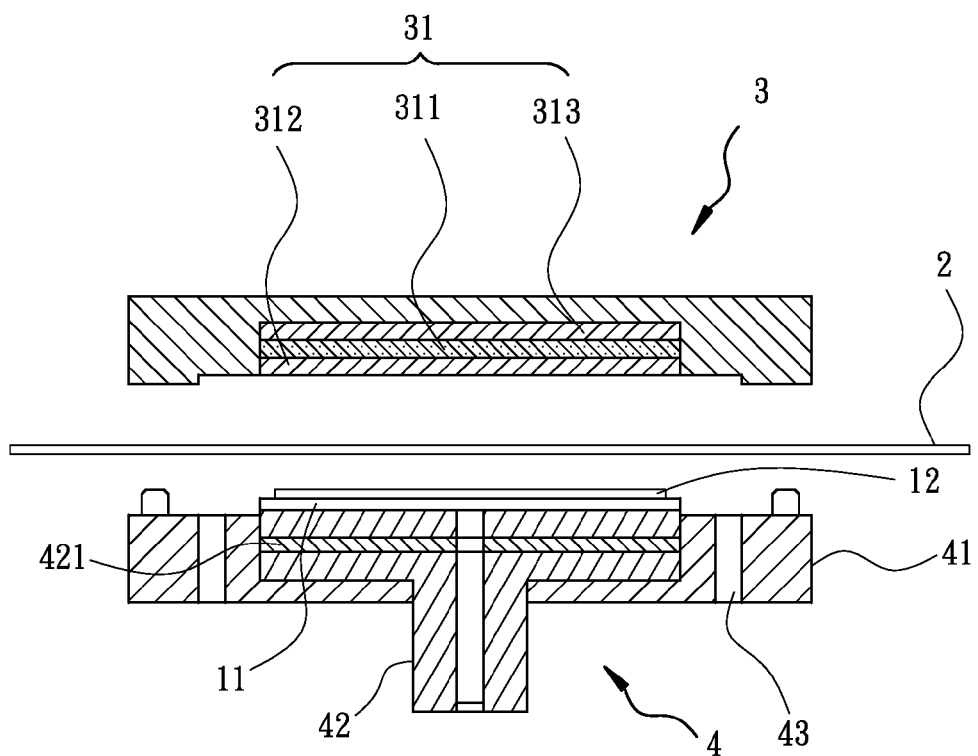

Referring to the drawings and initially to FIGS. 3-8, a flattening mechanism for dry film laminator in accordance with the present invention comprises a lower member 4 which is connected to a dry film laminator (not shown). The lower member 4 has a lifting holder 42 movably disposed thereon and provided for holding a wafer 11 on a top thereof. The lifting holder 42 has a second electric heating layer 421 mounted therein for heating the wafer 11 placed on the top of the lifting holder 42. The lower member 4 has a base portion 41 formed thereon and disposed around the lifting holder 42. The lifting holder 42 is able to move upwardly/downwardly relative to the base portion 41. The base portion 41 has a plurality of air holes 43 defined therein for extracting air.

An upper member 3 is disposed above the lower member 4 and able to move upwardly/downwardly relative to the lower member 4. The upper member 3 has a pressing portion 31 disposed on a bottom thereof and corresponds to a location of the lifting holder 42 of the lower member 4. The pressing portion 31 includes a steel plate 312 disposed on a bottom thereof and a first electric heating layer 311 mounted on a top of the steel plate 312 for producing heat, such that heat is transmitted from the first electric heating layer 311 to the steel plate 312. The pressing portion 31 has a heat insulating layer 313 formed on a top of the first electric heat layer 311 and located intermediately between the first electric heating layer 311 and the upper member 3 for preventing heat from transmitting to the upper member 3.

Moreover, a release film 2 movably guided and positioned between the upper member 3 and the lower member 4. When the upper member 3 moves downwardly against a top of the base portion 41 of the lower member 4 via the release film 2, a space 5 is defined between the upper member 3 and the lower member 4. The space 5 communicates with the air holes 43 on the base portion 41, such that air in the space 5 is able to be extracted through the air holes 43.

Figure 7:
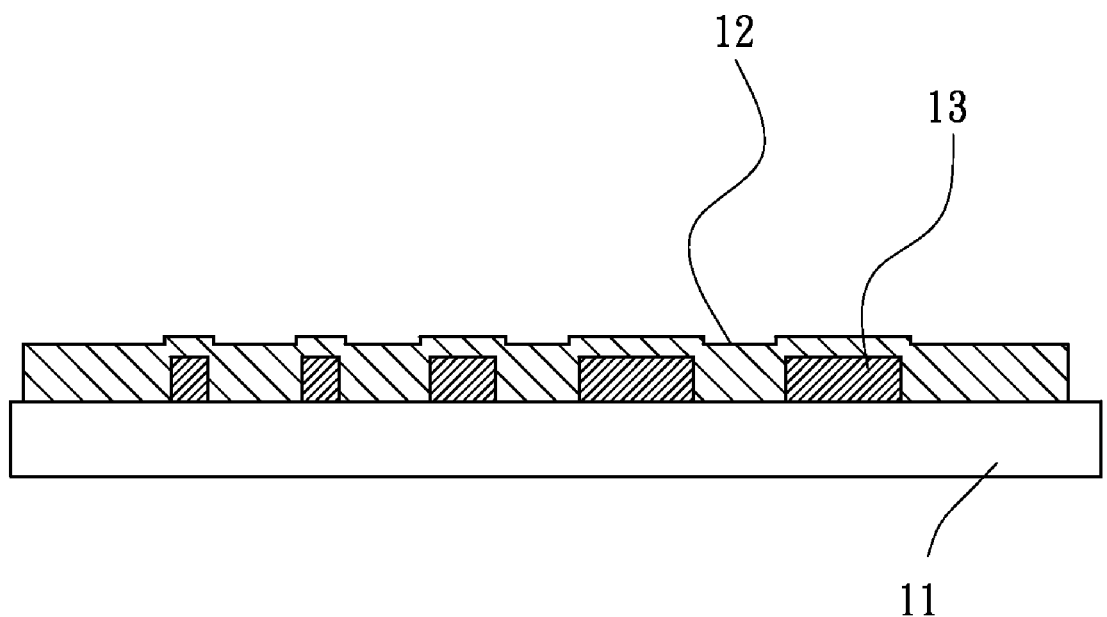
FIGS. 7-8 are plane views which respectively show the wafer having the dry film disposed thereon before and after operation of the flattening mechanism for dry film laminator in accordance with the present invention.
Figure 8:
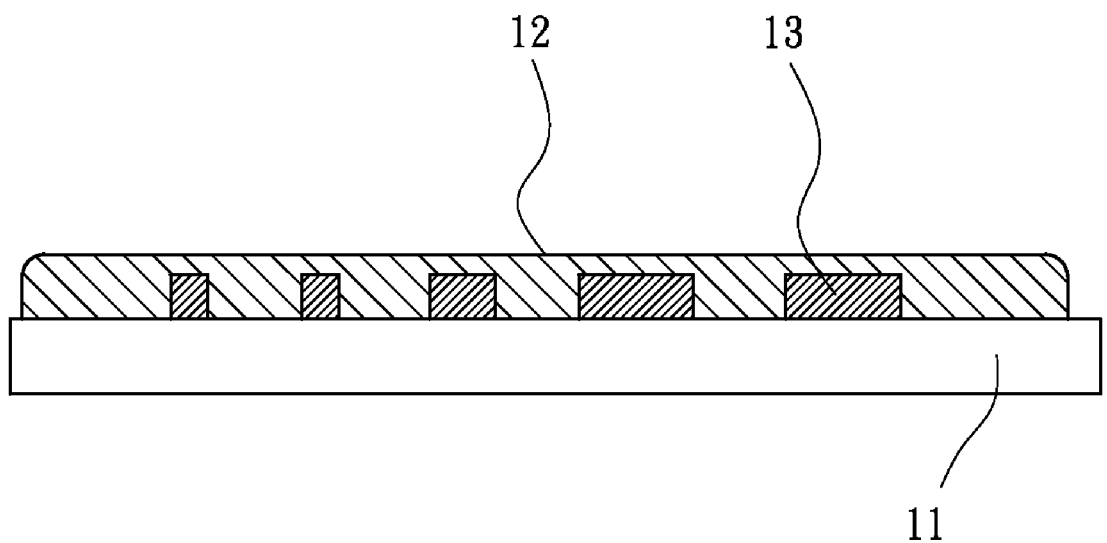

The operation of the flattening mechanism for dry film laminator in accordance with the present invention will be described in detail. Referring to FIG. 7, the wafer 11 includes a plurality of dies 13 spacedly formed on a top thereof. The wafer 11 has a dry film 12 which is pre-laminated on the dies 13. The dry film 12 is not flatly laminated on the wafer 11. As shown in FIGS. 3-6, the wafer 11 with the pre-laminated dry film 12 is placed on the lifting holder 42. The second electric heating layer 421 of the lifting holder 42 produces heat for heating the wafer 11. The upper member 3 moves downwardly against the base portion 41 of the lower member 4 via the release film 2. Air in the space 5 is extracted out through the air holes 43 for making the space 5 to a vacuum state. The lifting holder 42 moves upwardly and the wafer 11 is lifted to press against the steel plate 312 via the release film 2 for enhancing a lamination of the dry film 12 to the wafer 11. Heat which is produced by the first electric heating layer 311 is transmitted from the steel plate 312 to the dry film 12 for flattening a top surface of the dry film 12, such that the dry film 12 is flatly laminated on the wafer 11, which is shown in FIG. 8.

Followingly, the lifting holder 42 moves downwardly and the upper member 3 moves upwardly for changing to another wafer 11.

Figure 9:
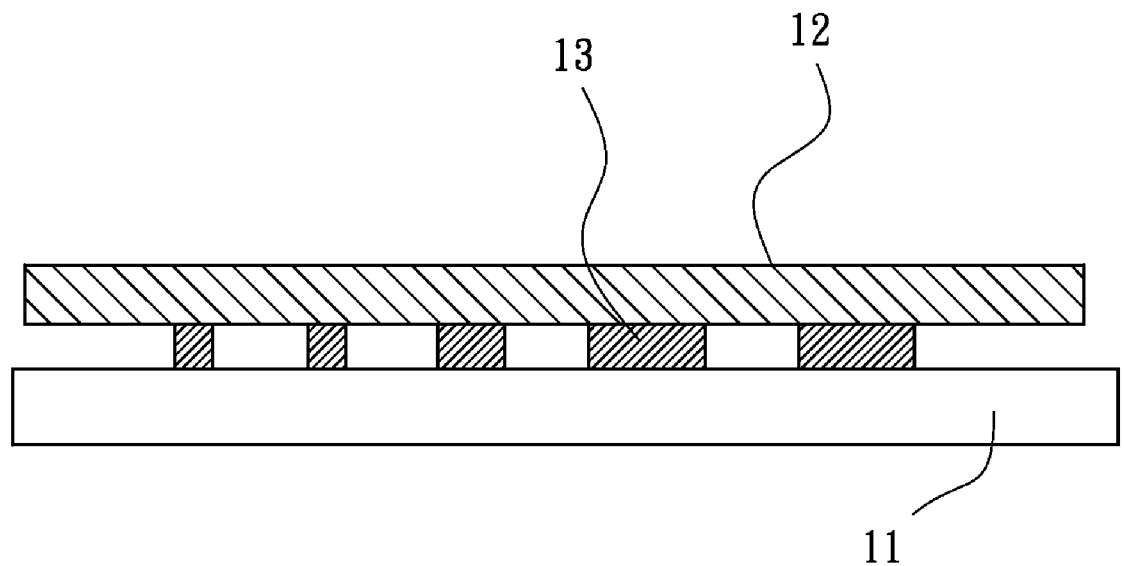
FIGS. 9-10 are plane views of a second embodiment which respectively show the wafer having the dry film disposed thereon before and after operation of the flattening mechanism for dry film laminator in accordance with the present invention.
Figure 10:
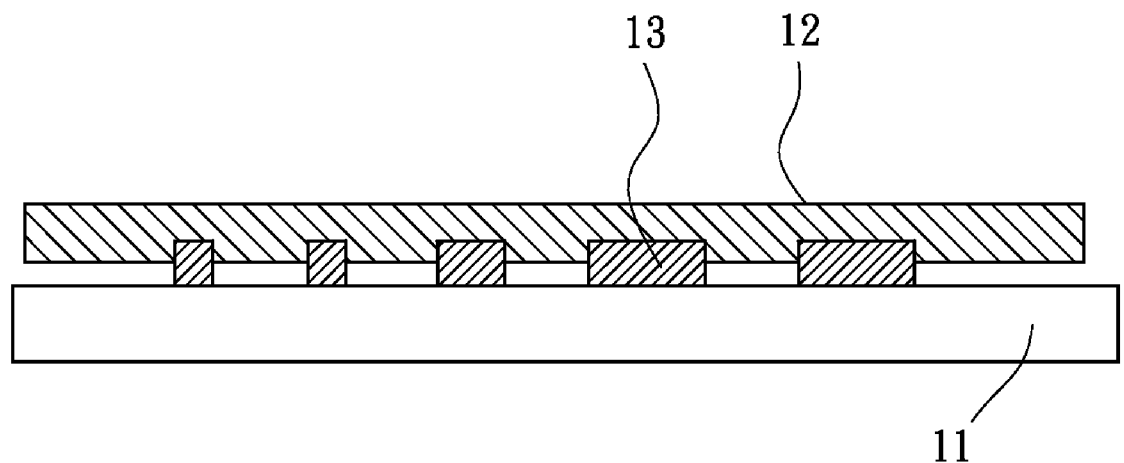

A second embodiment of the flattening mechanism for dry film laminator in accordance with the present invention is shown as follows. The elements and effects of the second embodiment which are the same with the preferred embodiment are not described, only the differences are described. In this embodiment, as shown in FIG. 9, the wafer 11 has a plurality of dies 13 spacedly formed thereon. A dry film 12 is placed on the dies 13 without lamination. After operating the flattening mechanism for dry film laminator in accordance with the present invention, the dry film 12 is flatly laminated and partially covers the dies 13 on the wafer 11, which is shown in FIG. 10.

Although the invention has been explained in relation to its preferred embodiment, it is to be understood that many other possible modifications and variations can be made without departing from the spirit and scope of the invention as hereinafter claimed.

What is claimed is:

1. A flattening mechanism for dry film laminator comprising:
a lower member adapting to be connected to a dry film laminator, the lower member having a base portion formed thereon, the base portion having a plurality of air holes defined therein for extracting air, the lower member having a lifting holder movably disposed thereon and being able to move upwardly/downwardly relative to the base portion, the lifting holder provided for holding a wafer on a top thereof, the wafer adapting to have a dry film disposed thereon;
an upper member disposed above the lower member and able to move upwardly/downwardly relative to the lower member, the upper member having a pressing portion disposed on a bottom thereof and corresponding to a location of the lifting holder of the lower member, the pressing portion including a steel plate disposed on a bottom thereof and a first electric heating layer mounted on a top of the steel plate for producing heat, such that heat is transmitted from the first electric heating layer to the steel plate; and
a release film movably guided and positioned between the upper member and the lower member;
wherein when the upper member moves downwardly against a top of the base portion of the lower member via the release film, a space is defined between the upper member and the lower member, the space communicating with the air holes on the base portion, air in the space extracted out through the air holes for making the space to a vacuum state, the lifting holder moving upwardly and the wafer lifted to press against the steel plate via the release film for adapting to enhance a lamination of the dry film to the wafer, heat produced by the first electric heating layer transmitted from the steel plate to the dry film for adapting to flatten the dry film.

2. The flattening mechanism for dry film laminator as claimed in claim 1, wherein the pressing portion of the upper member has a heat insulating layer formed on a top of the first electric heat layer for preventing heat from transmitting to the upper member.

3. The flattening mechanism for dry film laminator as claimed in claim 1, wherein the lifting holder has a second electric heating layer mounted therein for heating the wafer placed on the top of the lifting holder.

* * * * *